June 23, 1931.    G. MATAKOVICH    1,811,514
VEHICLE SPRING CONSTRUCTION
Filed Aug. 21, 1929    2 Sheets-Sheet 1

INVENTOR
GEORGE MATAKOVICH
BY
ATTORNEY

June 23, 1931.  G. MATAKOVICH  1,811,514
VEHICLE SPRING CONSTRUCTION
Filed Aug. 21, 1929   2 Sheets-Sheet 2
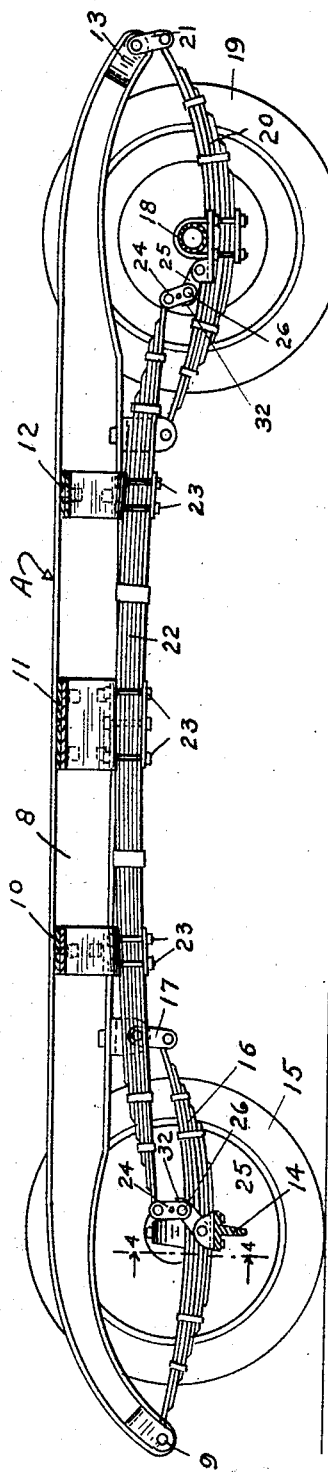
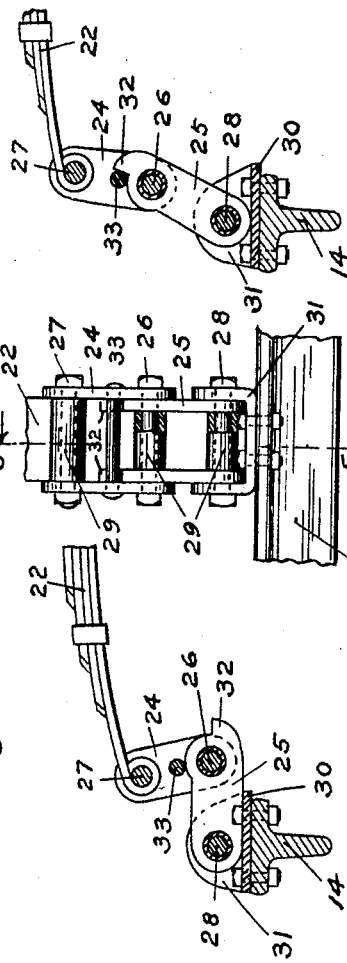
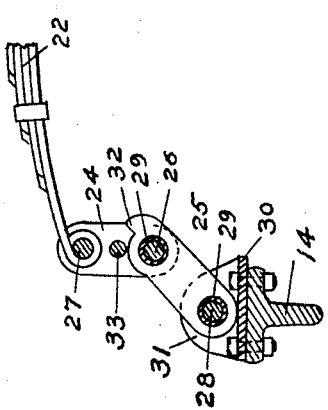
INVENTOR
GEORGE MATAKOVICH
BY
ATTORNEY Patented June 23, 1931

1,811,514

UNITED STATES PATENT OFFICE

GEORGE MATAKOVICH, OF KEEWATIN, MINNESOTA

VEHICLE SPRING CONSTRUCTION

Application filed August 21, 1929. Serial No. 387,331.

This invention relates to vehicle spring constructions and the primary object is to provide an efficient and practical mechanism in the form of supplemental springs that are so arranged and disposed with reference to the chassis and normal or ordinary supporting springs of the car that they will function or become operative only when excessive strains or rebound actions are imparted to the main or ordinary supporting springs. More specifically the invention contemplates the use of supplemental springs between the main frame of the vehicle and the front axle and rear axle housing which are virtually idle when the vehicle carries an ordinary or light load, and when ordinary road conditions are met with, but which will immediately become active under the strain of a heavy load and under the up and down strains imparted to the main springs under unusually rough road conditions. In short, the mechanism in question not only reinforces the ordinary springs of the car, under predetermined conditions, but also functions in the capacity of snubber and shock absorber. The invention, in conjunction with still other and more specific objects, as well as the operation thereof, will be fully described in the course of the following specification, reference being had to the accompanying drawings, wherein:

Fig. 3 is a longitudinal sectional elevation on the line 3—3 in Fig. 1.

Fig. 4 is an enlarged detail view of the auxiliary spring connection, as on the line 4—4 in Fig. 3, with fractional portions broken away for purpose of illustration.

Fig. 5 is a sectional elevation on the line 5—5 in Fig. 4, showing the normal positions of the auxiliary spring end and associated connecting device.

Fig. 6 is a view similar to Fig. 5 but showing the position of the parts when the axle is raised with respect to the main frame.

Fig. 7 is similar to Figs. 5 and 6, except that the axle is illustrated in a relatively low position to bring into play the snubbing action of the auxiliary spring.

Figure 1:
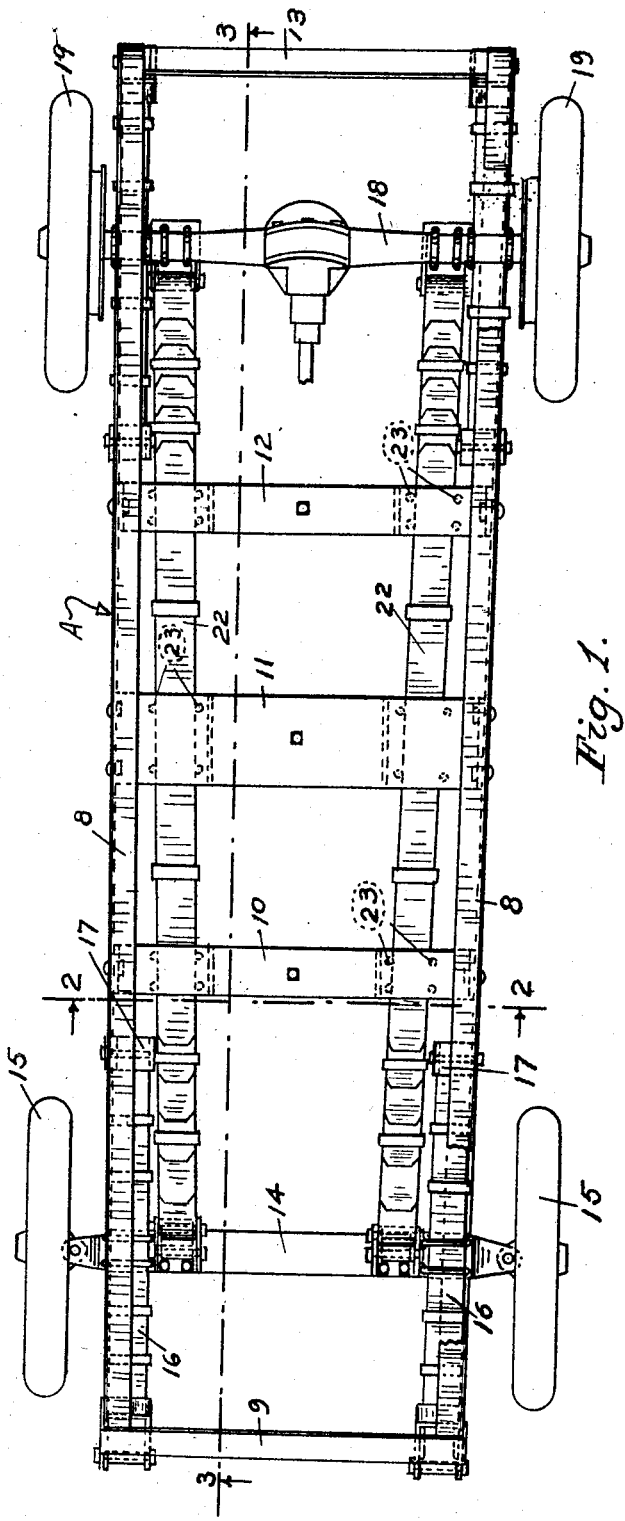
Fig. 1 is a plan view of a vehicle frame and associated parts, embodying my invention.
Figure 2:
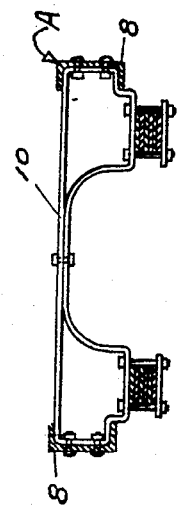
Fig. 2 is a transverse sectional elevation on the line 2—2 in Fig. 1.

Referring to the drawings more particularly and by reference characters, A designates the chassis or main frame of the vehicle, the same being made up of side rails 8 and connecting cross braces or bars 9, 10, 11, 12, and 13.

The front end of the frame is supported in the usual way on a front axle 14, having wheels 15, and connected to the main frame by the customary supporting springs 16 and shackles 17. At its rear the frame is supported on the axle housing 18, having ground wheels 19, and connected to the main frame by springs 20 and shackles 21, all of common and well known construction.

Extending longitudinally of the main frame and at opposite sides thereof, but preferably within the lateral limits of the springs 16 and 20, are a pair of auxiliary spring units 22, intermediate portions of which are rigidly secured to the cross beams 10, 11, and 12, by clamping plates 23. Each of these spring units consists of a plurality of spring leaves of different lengths, and the lowermost one of which is the longest. The front end of each spring unit 22 is disposed adjacent to but above the front axle 14, and is connected thereto by a pair of link members 24 and 25, pivotally connected as at 26, while the upper ends of the link members are attached to the spring 22 and axle 14 respectively, as at 27 and 28. As shown particularly in Fig. 4, these link members each comprise a pair of side bars, such as in a common link belt, and are separated by sleeves 29, through which the pivot pins 26, 27, and 28, extend.

As previously noted, the normal position of the spring 22 with respect to the axle 14, or to the rear axle housing 18 as the case may be, is that shown in Fig. 5, in which event there is no strain imparted to the link members 24 and 25 whatever. Assuming, however, that under a heavy load or unusually rough road conditions the axle 14 is pressed up toward the frame A, more than under ordinary conditions, then the link 25 will move downwardly to a horizontal position, such as shown in Fig. 6, at which time it will stop against the shoulder 30 of a bracket 31, by which it is attached to the axle 14, and at that moment the increased movement or additional upward pressure is brought to bear against the spring 22 through the link members 24, which then acts in the capacity of an ordinary spring shackle, and as long as the load is sufficiently heavy, or the upward strain on the axle 14 is sufficiently great, it will be seen that the spring 22 serves to supplement and reinforce the spring 16 (or 20).

At their upper ends the side bars of the links 25 are provided with lugs 32, which under certain circumstances stop against a pin 33 secured in the link bars 24, as best illustrated in Figs. 4 and 7. The object of this construction is to prevent the center of the pivot 26 coming into a dead center plane with respect to the pivots 27 and 28, and also to prevent the links 24 and 25 from passing beyond said dead center plane. From the foregoing description it will be understood that under road conditions which cause a downward rebound of the axle 14 with respect to the main frame, such as when passing over an unusually deep cavity or hollow in the road surface, the downward motion of the axle 14 with respect to the main frame is limited to that permitted by the combined lengths of the links 24 and 25, and when this limit of motion has been reached, it will also be seen that the said motion is then imparted to the supplemental spring 22, in which event the device exerts the snubbing action previously mentioned.

It is understood that the connection between the rear end of the supplemental spring 22 and the axle housing 18 is substantially identical with that above described in connection with the front axle, except, however, that the link construction is reversed so that the pivot center 26 will move downwardly and forwardly instead of downwardly and rearwardly.

It is understood that suitable modifications may be made in the structure as disclosed, provided, however, that such modifications come within the spirit and scope of the appended claims.

Having now, therefore, fully illustrated and described my invention what I claim to be new and desire to protect by Letters Patent is:

1. The combination comprising a vehicle frame, an axle, a primary spring unit supporting the frame with respect to the axle, a secondary spring unit comprising a horizontally disposed series of leaf springs secured to the frame with one end pivotally connected to the axle, said secondary spring unit being normally inactive, and means for rendering the secondary spring unit active when the frame is spread from the axle a predetermined distance.

2. The combination comprising a vehicle frame, an axle, a primary spring unit supporting the frame with respect to the axle, a secondary spring unit secured to the frame at a point longitudinally remote from the axle and having one end attached by a double link connection to the axle, said secondary spring unit being normally inactive, and means operative through the link connection for rendering the secondary spring unit active when the axle and frame are moved to a predetermined proximity with respect to each other.

3. The combination comprising a vehicle frame, an axle, a primary spring unit supporting the frame with respect to the axle, a normally inactive secondary spring unit carried by the frame, and a pair of links connecting the axle with one end of the secondary spring.

4. The combination comprising a vehicle frame, an axle, a primary spring unit supporting the frame with respect to the axle, a secondary spring unit to supplement the primary spring unit, a pair of pivotally connected link members connecting the secondary spring unit to the axle, said secondary spring unit being normally inactive, and means for rendering the secondary spring unit active upon the exertion of a predetermined pressure to the primary spring unit.

5. The combination comprising a vehicle frame, an axle, a primary spring unit supporting the frame wtih respect to the axle, a secondary spring unit to supplement the primary spring unit and anchored to the frame at a point longitudinally beyond the nearest end of the primary spring unit, said secondary spring unit being normally inactive, and means for rendering the secondary spring unit active upon the exertion of a predetermined pressure to the primary spring unit in either an up or down direction.

6. The combination with the frame, front axle, rear axle housing, and supporting springs of a vehicle, of a pair of auxiliary spring units extending longitudinally of the frame and carried thereby, and pairs of normally inactive link members connecting the ends of the auxiliary springs with the axle and axle housing.

7. The combination with the frame, front axle, rear axle housing, and supporting springs of a vehicle, of a pair of auxiliary spring units extending longitudinally of the frame and carried thereby, and pairs of link members connecting the ends of the auxiliary springs with the axle and axle housing, said link members being normally in inactive positions.

8. The combination comprising a vehicle frame, an axle, a primary spring unit supporting the frame with respect to the axle, a normally inactive secondary spring unit anchored to the frame, and a pair of link members having relatively limited freedom of angular action and connecting the axle with the secondary spring unit.

9. The combination comprising a vehicle frame, an axle, a primary spring unit supporting the frame with respect to the axle, a secondary normally inactive spring unit secured to the frame with one end connected to the axle, a sectionally formed jointed connector between the axle and secondary spring unit, and means for checking the swinging actions of the connector sections with respect to each other.

10. The combination comprising a vehicle frame, an axle, a primary spring unit supporting the frame with respect to the axle, a secondary spring unit secured to the frame with one end connected to the axle, a sectionally formed jointed connector between the axle and secondary spring unit, and means for checking the swinging movement of one of the sections with respect to the axle.

11. The combination with the frame of a vehicle, and an axle spring connected thereto, of a supplemental spring carried by the frame, a pair of link members pivotally connecting the supplemented spring with the axle, and a stop for limiting the swing of one of the link members.

12. The combination with the frame of a vehicle, and an axle spring connected thereto, of a supplemental spring carried by the frame, a pair of link members pivotally connecting the supplemented spring with the axle, and a stop carried by one of the link members to limit the movement of the other member with respect thereto.

Signed at Keewatin, in the county of Itasca, and State of Minnesota, this 17th day of August, 1929.

GEORGE MATAKOVICH.